United States Patent
Deshpande et al.

(10) Patent No.: US 6,904,269 B1
(45) Date of Patent: Jun. 7, 2005

(54) SIGNAL TYPE IDENTIFICATION

(75) Inventors: Nikhil Deshpande, Hillsboro, OR (US);
Thomas C. Hill, Beaverton, OR (US);
R. Eben Jenkins, Portland, OR (US);
Kathryn A. Engholm, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 423 days.

(21) Appl. No.: 09/587,491

(22) Filed: Jun. 2, 2000

(51) Int. Cl.$^7$ ............................ H04B 1/18; H04B 17/00
(52) U.S. Cl. .................... 455/142; 455/143; 455/67.11; 455/150.1; 455/226.1; 375/227; 375/228; 324/76.11; 324/76.19
(58) Field of Search ............................... 455/142, 143, 455/110, 67.1, 67.2, 67.3, 150.1, 159.1, 226.1, 226.4, 296, 410, 411, 140, 423, 424, 425; 375/227, 228, 224, 316; 324/76.11, 76.19, 76.22; 762/76, 77

(56) References Cited

U.S. PATENT DOCUMENTS

| | | | |
|---|---|---|---|
| 4,085,367 A | * 4/1978 | Williams et al. | 324/76.13 |
| 4,166,980 A | * 9/1979 | Apostolos et al. | 375/316 |
| 4,305,159 A | 12/1981 | Stromswold | |
| 4,501,020 A | 2/1985 | Wakeman | |
| 4,859,933 A | * 8/1989 | Taylor et al. | 324/76.29 |
| 4,862,506 A | * 8/1989 | Landgarten et al. | 381/71.2 |
| 4,890,099 A | * 12/1989 | Takano | 345/684 |
| 5,381,150 A | 1/1995 | Hawkins | |
| 5,530,454 A | * 6/1996 | Etheridge et al. | 345/440.1 |
| 5,959,607 A | * 9/1999 | Montijo | 345/440.1 |
| 6,104,922 A | * 8/2000 | Baumann | 455/410 |
| 6,140,809 A | * 10/2000 | Doi | 324/76.24 |
| 6,212,229 B1 | * 4/2001 | Salinger | 333/81 R |
| 6,690,746 B1 | * 2/2004 | Sills et al. | 375/316 |
| 2001/0036151 A1 | * 11/2001 | Cimini, Jr. et al. | 370/210 |
| 2002/0101936 A1 | * 8/2002 | Wright et al. | 375/296 |

FOREIGN PATENT DOCUMENTS

| | | | | |
|---|---|---|---|---|
| DE | 199 10 902 A | | 10/1999 | |
| EP | 1 161 043 | * | 5/2001 | H04L/27/00 |
| GB | 2 234 077 A | | 1/1991 | |
| JP | 02002064444 | * | 2/2002 | H04B/17/00 |

OTHER PUBLICATIONS

"Estimation of Error Vector Magnitude Using Two–Tone Intermodulation Distortion Measurements" by Hyunchul Ku IEEE 2001 0–7803–6538–0/01.*

"The Use of Interleaving to Reduce the Peak–to–Average Power ratio of an OFDM Signal" by A.D.S. Jayalath IEEE 2000 0–7803–6451–1/00.*

Liedtke F. F., "Computer Simulation Of An Automatic Classification Procedure For Digitally Modulated Communication Signals With Known Parameters.", Signals Processing, Amsterdam, NL vol. 6, 1984, pp. 311–323, XP000602823, ISSN: 0165–1684.

Callaghan T.G. et al, "Sampling and Algorithms Aid Modulation Recognition", Microwaves and RF, Penton Publishing, Hasbrouck Heights, NJ, US vol. 24, No. 9, Sep. 1985, pp. 117–119, 121, XP000763996, ISSN: 0745–2993.

Hipp, J. E., "Modulation Classification Based On Statistical Moments", Proceedings Of The Military Communications Conference. (Milcom) Monterey, Oct. 5–9, 1986, New York IEEE, US vol. 2, Oct. 1, 1986 pp. 20201–20206, XP000795181.

* cited by examiner

*Primary Examiner*—Nay Maung
*Assistant Examiner*—Edan Orgad
(74) *Attorney, Agent, or Firm*—Francis I. Gray

(57) ABSTRACT

A method of identifying a signal type uses parameters of the signal as a basis for automatic identification. A signal of interest is selected from a display of a spectral waveform for a specified frequency. An occupied bandwidth for the signal of interest is estimated and, if the occupied bandwidth is common to more than one known signal type, a complementary cumulative distribution function of peak power for the signal of interest is estimated. The signal type may be identified as a function of these parameters. Additionally the frequency of the signal of interest may be compared with a database of spectral assignments for known signal types to provide further information about the signal of interest.

6 Claims, 3 Drawing Sheets

SIGNAL TYPE IDENTIFICATION

BACKGROUND OF THE INVENTION

The present invention relates to radio frequency (RF) signal measurements, and more particularly to the signal type identification of an unknown signal.

In measuring and testing RF systems there occur from time to time interfering signals. This may show up on a spectral display, such as that generated by a spectrum analyzer, as an extraneous signal in the frequency domain, as shown in FIG. 1. A skilled operator, technician or engineer may manually identify the interfering signal by making appropriate adjustments to the spectrum analyzer control parameters and having skill in identifying those parameters that are unique to different types of signals, both modulated and unmodulated. There are many signal types that may occur in the normal environment, such as IS-95 CDMA signals, North American Digital Cellular (NADC) TDMA signals, Global System for Mobile (GSM) TDMA signals, Analog Mobile Phone System (AMPS) FM signals, Continuous Wave (CW) signals and W-CDMA or CDMA 2000 signals.

In normal field testing and measuring conditions the operator may not be a skilled operator, technician or engineer and, thus, may not have the skill and experience necessary to discriminate and identify to which of the signal categories a particular unknown signal belongs. What is desired is an instrument that automatically identifies an unknown modulated signal with a reasonable confidence level for the unskilled operator.

BRIEF SUMMARY OF THE INVENTION

Accordingly the present invention provides a method of modulation identification for an unknown modulated signal. A frequency spectrum is displayed in a conventional manner and an operator selects an unknown signal so displayed in a conventional manner, such as touching the screen, adjusting a cursor, clicking a mouse cursor and the like. The selection activates an identification algorithm which processes the data representing the signal according to specified parameters. Typical parameters may be frequency, occupied bandwidth (OBW) and complementary cumulative distribution function (CCDF) of the peak power of the signal. Occupied bandwidth may be used to particularly identify the signal modulation for most signal modulation candidates. Finally CCDF may be used where more than one signal modulation candidate has the same OBW. A table or database of spectral assignments for known modulated signals may be used to select signal modulation candidates based on frequency. The resulting identification may be displayed and may include frequency, expected characteristics, whether the signal is modulated or not, detected modulation and other pertinent information.

The objects, advantages and other novel features of the present invention are apparent from the following detailed description when read in conjunction with the appended claims and attached drawing.

DETAILED DESCRIPTION OF THE INVENTION

From the list of signals that need to be identified, it is seen that almost every signal type has some specific "signature" parameter. One such parameter may be the frequency. A database or table of stored information containing spectral band assignments for various types of modulated signals may be used. When a signal is selected by suitable means, such as cursor positioning via mouse or dial, touching or the like, the database may be consulted to see what signal or signals may be expected to exist at the selected frequency of the selected signal.

Another parameter is the "Occupied BandWidth of the signal" (OBW). Since the OBW measurement may be done directly on an intermediate frequency (IF) signal without demodulating the signal, it is fairly straight forward using existing algorithms, such as using fast Fourier transform (FFT) and estimating the number of bins for 95% of total power. Table 1 below shows signals that may be measured, the signals that have high correlation in spectral characteristics, and the defining identification parameter.

TABLE 1

| SIGNAL | SIMILAR SIGNAL | HOW TO IDENTIFY |
| --- | --- | --- |
| CW | 30 kHz AMPS or NADC | Use OBW |
| 30 kHz AMPS | 30 kHz NADC | Use CCDF |
| 30 kHz NADC | 30 kHz AMPS | Use CCDF |
| 200 kHz FM | 200 kHz GSM | Use CCDF |
| 200 kHz GSM | 200 kHz FM | Use CCDF |
| CDMA IS-95 | 3G CDMA | Use OBW |
| 3G CDMA | CDMA IS-95 | Use OBW |

Most of the signals may be discriminated among simply by calculating the OBW of the signal. The algorithm considers signals with the OBW less than 30 kHz to be CW. Problems arise in discriminating the AMPS signal from the NADC signal and the 200 kHz FM signal from the GSM signal because these signal pairs each have the same OBW. What is needed for these situations is another parameter or deciding factor that is unique to each of these signals.

Although both AMPS and NADC signals have the same OBW and look quite alike in the spectral domain, they have a fundamental difference—the AMPS signal is an analog signal while the NADC signal is a digital signal. The AMPS signal is a frequency varying, relatively constant amplitude carrier while the NADC is a carrier modulated with QPSK data. Because of this difference the AMPS signal may be classified as a "deterministic" signal while the NADC signal may be classified as a "probabilistic" signal. The determination as to whether the signal is deterministic or probabilistic may be performed relatively easily without demodulating the signal. This parameter is the Complementary Cumulative Distribution Function (CCDF) of the peak power of the signal, and may be used to distinguish between the AMPS signal and the NADC signal even if they occupy the same bandwidth. Because of the inherent digital nature of the NADC signal, it has a much "flatter" CCDF than the AMPS signal, as shown by comparing FIGS. 2 and 3. The same is true for discriminating the 200 kHz FM signal from the GSM signal.

Figure 1:
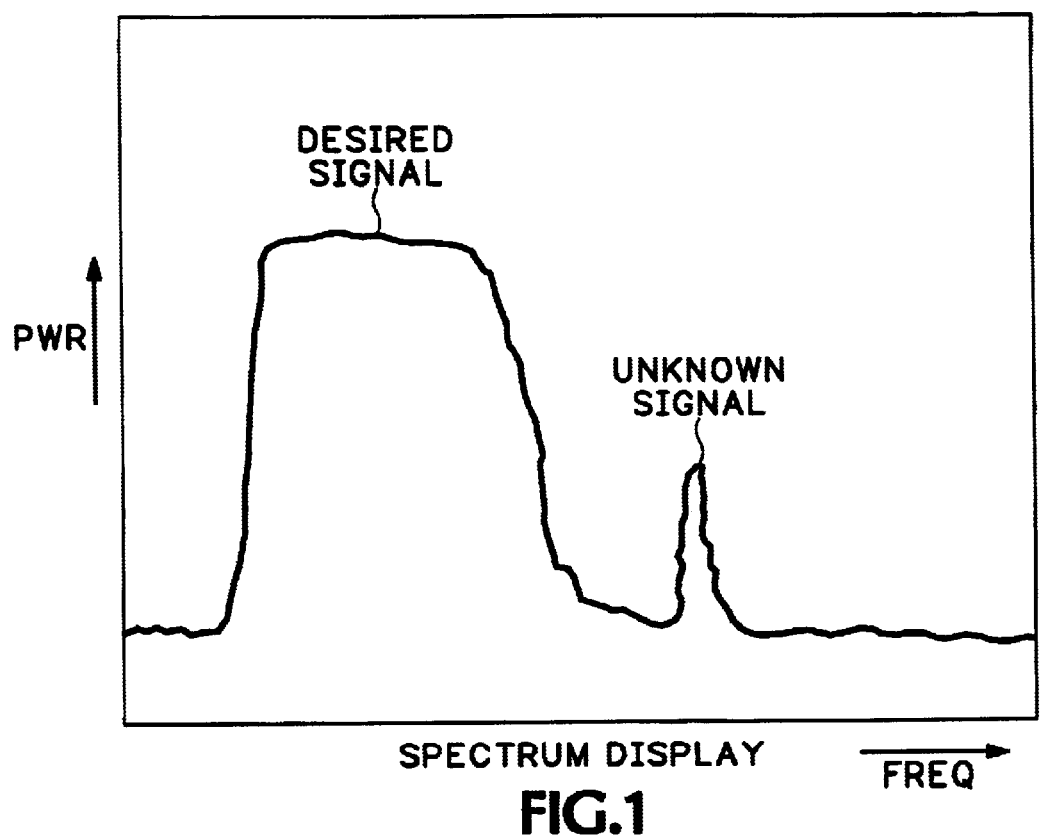
FIG. 1 is a plan view of a display of a frequency spectrum showing a known and unknown signal simultaneously.
Figure 2:
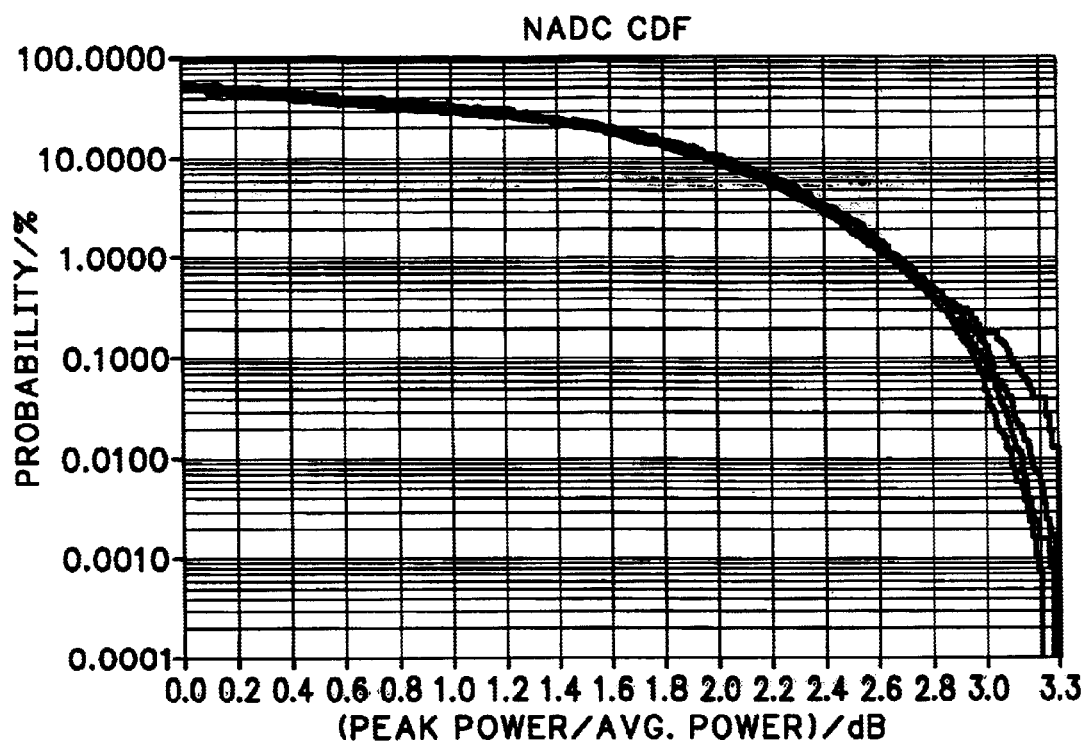
FIG. 2 is a graphic view of a complementary cumulative distribution function for an NADC digital signal.
Figure 3:
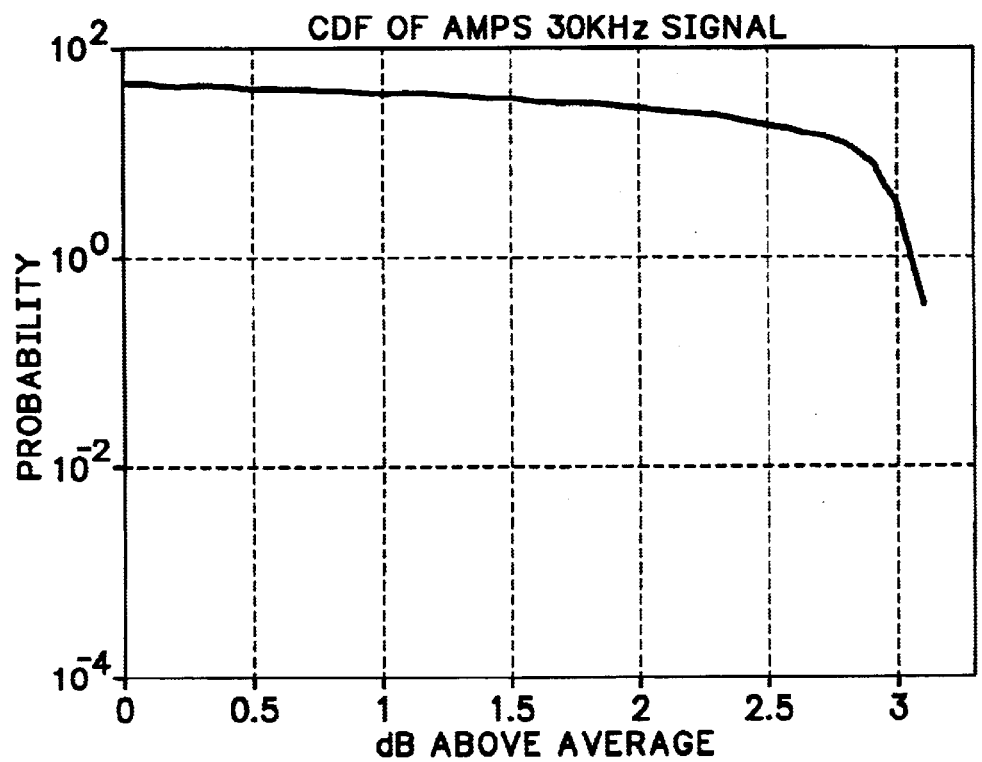
FIG. 3 is a graphic view of a complementary cumulative distribution function for an AMPS analog signal.

From the curves of FIGS. 2 and 3 the CCDF of the AMPS signal follows typical deterministic sinusoidal characteristics where there are no observable statistical peaks below 1% probability. This makes sense since the AMPS signal is a relatively constant amplitude frequency varying sinusoid. On the other hand the NADC signal has some statistical peaks below the 1% probability point. Table 2 shows a comparison between the two CCDFs.

TABLE 2

| Comparison Point | CCDF for AMPS Signal | CCDF for NADC Signal |
| --- | --- | --- |
| 10% probability | 3 dB | 1.9 dB |
| 1% probability | 3.1 dB | 2.6 dB |
| 0.1% probability | NA | 3.0 dB |
| 0.01% probability | NA | 3.15 dB |
| 0.001% probability | NA | 3.3 dB |

Therefore these signals may be distinguished based on the CCDF characteristics of the peak power, as indicated in Table 1.

Figure 4:
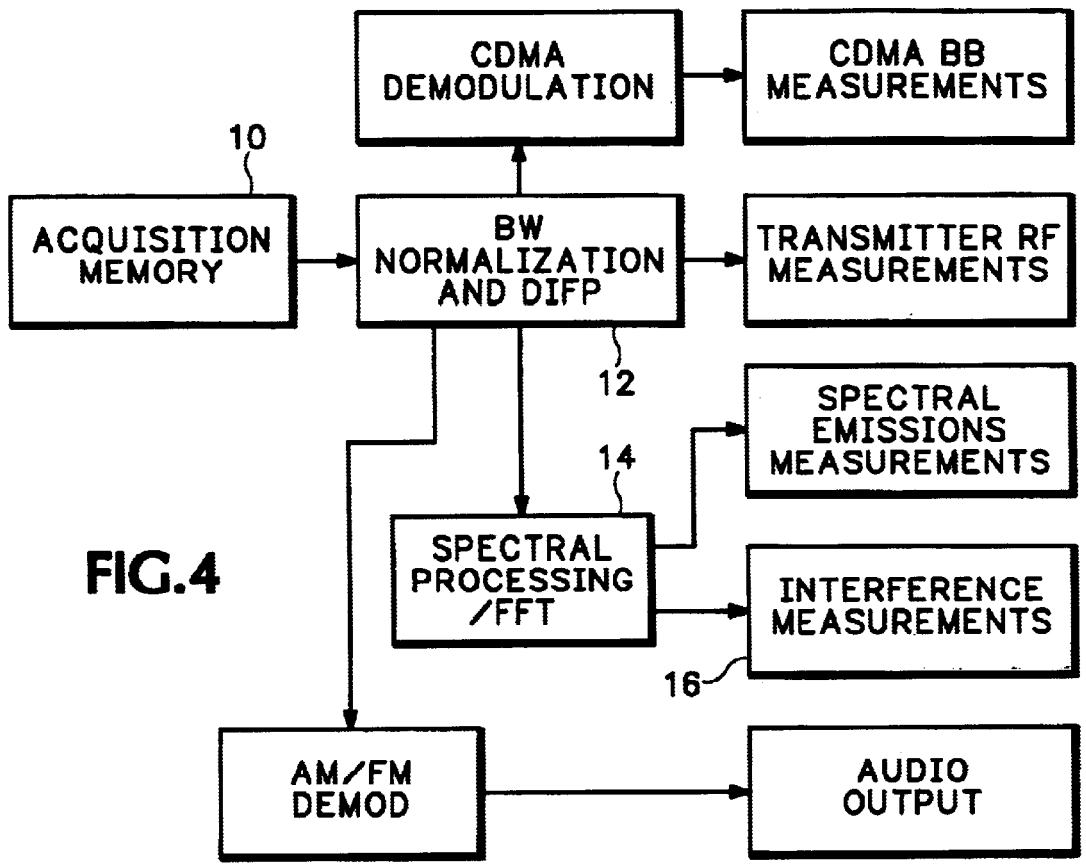
FIG. 4 is a block diagram view for an architecture of an instrument that includes signal type identification according to the present invention.

FIG. 4 shows an architecture for an instrument that includes signal type identification. When the signal is selected by an operator from the spectral display, the signal is downconverted, resampled and acquired in an acquisition memory 10. The preprocessed signal in the acquisition memory 10 is processed by a fast Fourier transform (FFT) 14. The FFT output is then sent to a signal type identification algorithm 16 for interference measurements. The FFT may be done in either hardware or software.

Figure 5:
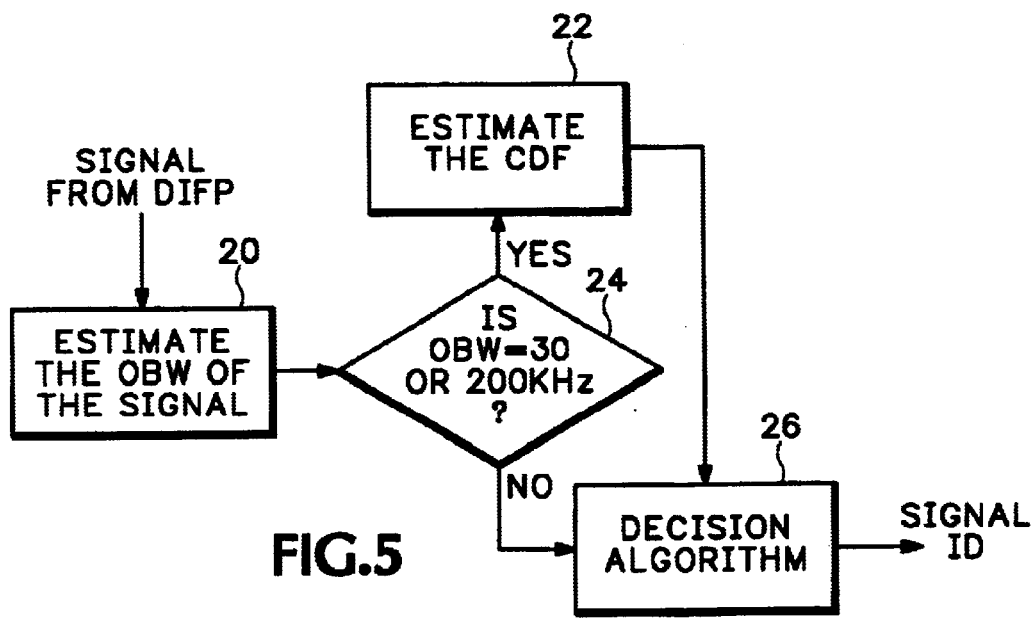
FIG. 5 is a flow chart view of an algorithm for signal type identification according to the present invention.

The algorithm is shown in FIG. 5. There are two components to the algorithm: first the algorithm computes the occupied bandwidth 20 of the input signal; and second the algorithm further estimates the CCDF 22 of the signal and determines if the signal is analog or digital. If the OBW is not equal to 30 kHz or 200 kHz, the second step 22 is bypassed. The CCDF estimation is done only if the OBW is equal to 30 kHz or 200 kHz as determined by a decision step 24, the bandwidths that are common to the AMPS signal and NADC signal or the FM signal and the GSM signal pairs respectively. From the OBW and CCDF results a decision 26 is made to identify the signal. As indicated above, the frequency of the signal may be compared with the database of spectral assignments to provide additional data about the possible signals. The results from the algorithm may be displayed, either on the same display as the spectral display or another interface display. The results may include frequency, expected signal characteristics, detected modulation type, if any, and other pertinent information.

Thus the present invention provides a means for identifying an unknown signal, without having to demodulate it if it is modulated, using one or more of a plurality of parameters, such as spectral band assignment, occupied bandwidth and/or complementary cumulative distribution function of peak power.

What is claimed is:

1. A method of identifying a signal type for an unknown signal comprising the steps of:

selecting the unknown signal from a displayed spectral waveform for a specified range of frequencies;

processing spectral data representing the unknown signal to ascertain characteristics of the unknown signal without demodulating the unknown signal; and from the characteristics of the unknown signal determining an identification of the signal type.

2. The method as recited in claim 1 wherein the determining step comprises the step of comparing the frequency of the unknown signal with a database of spectral assignments for a plurality of known signal types to identify the signal type.

3. The method as recited in claim 1 wherein the processing step comprises the step of estimating from the spectral data an occupied bandwidth for the unknown signal as one of the characteristics for input to the determining step.

4. The method as recited in claim 3 wherein the processing step further comprises the step of estimating from the spectral data a complementary cumulative distribution function of the peak power for the unknown signal as one of the characteristics for input to the determining step.

5. The method as recited in claim 4 wherein the determining step comprises the steps of:

inhibiting the estimating step for the complementary cumulative distribution function if the occupied bandwidth is unique to a known signal type; and determining the identification for the signal type based upon the complementary cumulative distribution function if the occupied bandwidth is common to more than one known signal type.

6. A method of discriminating between modulation signals comprising the steps of:

selecting one of the modulation signals as a signal of interest from a displayed spectral waveform for a specified frequency range;

estimating an occupied bandwidth for the signal of interest from data representing the signal of interest;

estimating a complementary cumulative distribution function of peak power from the data for the signal of interest where the occupied bandwidth is common to more than one known signal type;

reporting an identification of the signal type as a function of the complementary cumulative distribution function.

* * * * *